US012803054B2

(12) United States Patent
Dong et al.

(10) Patent No.: US 12,803,054 B2
(45) Date of Patent: Nov. 17, 2026

(54) MULTI-LITHIUM SALT ELECTROLYTE AND LITHIUM-BASED BATTERY COMPRISING THE SAME

(71) Applicant: Nano and Advanced Materials Institute Limited, Hong Kong (HK)

(72) Inventors: Ou Dong, Hong Kong (HK); Hong Sun, Hong Kong (HK); Shengbo Lu, Hong Kong (HK); Chenmin Liu, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 661 days.

(21) Appl. No.: 18/327,052

(22) Filed: Jun. 1, 2023

(65) Prior Publication Data

US 2023/0395863 A1 Dec. 7, 2023

Related U.S. Application Data

(60) Provisional application No. 63/348,010, filed on Jun. 1, 2022.

(51) Int. Cl.
*H01M 10/0568* (2010.01)
*H01M 4/505* (2010.01)
(Continued)

(52) U.S. Cl.
CPC ........ *H01M 10/0568* (2013.01); *H01M 4/505* (2013.01); *H01M 4/525* (2013.01); *H01M 4/5825* (2013.01); *H01M 10/0567* (2013.01); *H01M 10/0569* (2013.01); *H01M 50/414* (2021.01); *H01M 50/491* (2021.01);
(Continued)

(58) Field of Classification Search
CPC .. H01M 10/0568; H01M 4/505; H01M 4/525; H01M 4/5825; H01M 10/0567; H01M 10/0569; H01M 50/414; H01M 50/491; H01M 2004/028; H01M 2300/0042; H01M 2300/0051;
(Continued)

(56) References Cited

U.S. PATENT DOCUMENTS 7,348,101 B2 3/2008 Gozdz et al.
8,642,212 B2 2/2014 Marple
(Continued)

FOREIGN PATENT DOCUMENTS

JP 2012104439 * 5/2012

OTHER PUBLICATIONS

Jianming Zheng et al., "Electrolyte additive enabled fast charging and stable cycling lithium metal batteries" Nature Energy(2), article No. 17012, Mar. 1, 2017.

*Primary Examiner* — Lisa S Park
(74) *Attorney, Agent, or Firm* — IDEA Intellectual Limited; Sam T. Yip

(57) ABSTRACT

A lithium-based battery including an electrolyte having at least two lithium salts selected from $LiPF_6$, LiTFSI, LiFSI or $LiBF_4$, along with a further lithium salt additive. Through the selection of particular lithium salt combinations, a high lithium ion concentration in the electrolyte is maintained. The battery includes a cathode, an anode, and a porous polymer separator. The lithium-based battery has reliable capacity retention at high discharge rates, such as 10C to 15C.

15 Claims, 6 Drawing Sheets

(51) Int. Cl.

| | |
|---|---|
| ***H01M 4/525*** | (2010.01) |
| ***H01M 4/58*** | (2010.01) |
| ***H01M 10/0567*** | (2010.01) |
| ***H01M 10/0569*** | (2010.01) |
| ***H01M 50/414*** | (2021.01) |
| ***H01M 50/491*** | (2021.01) |
| *H01M 4/02* | (2006.01) |

(52) U.S. Cl.
CPC ................. *H01M 2004/028* (2013.01); *H01M 2300/0042* (2013.01); *H01M 2300/0051* (2013.01)

(58) Field of Classification Search
CPC .. H01M 4/386; H01M 4/587; H01M 10/0525; H01M 50/417; Y02E 60/10
See application file for complete search history.

(56) References Cited

U.S. PATENT DOCUMENTS

| | | | | |
|---|---|---|---|---|
| 8,703,009 | B2 | 4/2014 | Liu et al. | |
| 11,063,297 | B2 | 7/2021 | Newhouse et al. | |
| 2010/0297490 | A1* | 11/2010 | Takami ............. | H01M 10/0525 429/131 |
| 2022/0223911 | A1* | 7/2022 | Kim ..................... | C07D 233/60 |

* cited by examiner

MULTI-LITHIUM SALT ELECTROLYTE AND LITHIUM-BASED BATTERY COMPRISING THE SAME

CROSS-REFENCE TO RELATED APPLICATION

The present application claims the priority from the U.S. provisional patent application Ser. No. 63/348,010 filed Jun. 1, 2022, and the disclosure of which is incorporated herein by reference in its entirety.

FIELD OF THE INVENTION

The present invention relates to a lithium-based battery and, more particularly, to a lithium-based battery having an electrolyte including at least two lithium salts.

BACKGROUND

Lithium-ion batteries (LIBs) have become one of the most important electrochemical energy storage technologies, which have largely impacted our daily life. The increasing need for portable power sources has caused a growing demand for high rate discharge (higher than 5C) lithium-ion batteries. These batteries are applicable to a wide range of fields, including power tools, drones, and home appliances such as handheld vacuum cleaners, handheld massagers, etc. These devices usually need higher power output to drive motors which require both high voltage and high current output during starting and continuous working periods. However, conventional lithium ion batteries cannot meet those demands as the internal resistance will increase drastically due to polarization which will lower the output voltage as well as the output current after heat generation.

Therefore, there is a need for novel electrolyte formulations which are able to improve capacity retention at high discharge rates. The present invention addresses this need.

SUMMARY OF THE INVENTION

The present invention provides a lithium-based battery includes an electrolyte, a cathode, an anode, and a porous polymer separator. The electrolyte includes at least two lithium salts selected from lithium hexafluorophosphate ($LiPF_6$), lithium bis(trifluoromethanesulfonyl)imide (LiTFSI), lithium bis(fluorosulfonyl)imide (LiFSI) or lithium tetrafluoroborate ($LiBF_4$).

In particular, the electrolyte includes a lithium hexafluorophosphate first salt and at least one second lithium salt selected from lithium bis(trifluoromethanesulfonyl)imide, lithium bis(fluorosulfonyl)imide or lithium tetrafluoroborate. The molar ratio of lithium hexafluorophosphate to the second lithium salt ranges from 15:1 to 1:6 and a concentration in the electrolyte of the first salt and the at least one second salt is from approximately 1.5M to approximately 5M. The electrolyte further comprises a lithium salt additive in an amount from 0.1% to 5% of a total weight of the electrolyte. The lithium salt additive may be lithium difluoro (oxalato)borate (LiDFOB) lithium bis(oxalate) borate, lithium difluoro(bisoxalato)phosphate, or lithium difluorophosphate in an embodiment.

The cathode is selected from lithium manganese oxide, lithium cobalt oxide, lithium nickel manganese cobalt oxide, lithium iron phosphate or combinations thereof. The anode is selected from silicon, silicon oxide, carbon nanotubes, lithium metal, graphene, graphite or combinations thereof.

The addition of the second lithium salt (for example, lithium bis[trifluoromethanesulfonyl]imide, lithium bis [fluorosulfonyl]imide or lithium tetrafluoroborate) into the lithium hexafluorophosphate electrolyte can significantly increase the $Li^+$ concentration. The increase of $Li^+$ concentration reduces polarization caused by a concentration difference of $Li^+$ because of poor transportation of $Li^+$ at high discharge rate. The concentration difference of $Li^+$ between the electrode and electrolyte causes concentration polarization. With the addition of the second Li salt, the concentration polarization can be greatly reduced.

The lithium-based battery of the present invention has improved capacity retention at high discharge rate. Particularly, the lithium-based battery has capacity retention of at least 10% at a discharge rate of 10C or more. The lithium-based battery can be discharged at a low temperature, for example, −20° C. The lithium-based battery has acceptable capacity retention after multiple charge-discharge cycles, which demonstrates long service life, and has great potential to product application.

In another aspect, the electrolyte has a lithium bis(trifluoromethanesulfonyl)imide concentration and/or lithium bis(fluorosulfonyl)imide concentration and/or lithium tetrafluoroborate concentration of 0.1 M to 3.0 M.

In another aspect, the molar ratio of lithium hexafluorophosphate to the other lithium salt ranges from 2:1 to 2:3. The lithium-based battery is specifically suitable for high voltage and high current output.

In another aspect, the electrolyte further comprises a solvent selected from ethylene carbonate (EC), diethyl carbonate (DEC), ethyl methyl carbonate (EMC), dimethyl carbonate (DMC) or combinations thereof.

In one of the embodiments, EC is 20% to 70% (v/v) based on the solvent.

In one of the embodiments, DEC is 2% to 50% (v/v) based on the solvent.

In one of the embodiments, EMC is 2% to 60% (v/v) based on the solvent.

In one of the embodiments, DMC is 2% to 60% or less (v/v) based on the solvent.

In another aspect, the electrolyte further comprises an additive selected from fluoroethylene carbonate (FEC), vinylene carbonate (VC), 1,3-propane sultone (PS), propylene carbonate (PC) or combinations thereof.

In one of the embodiments, FEC is 0.1 to 5 wt % in the electrolyte.

In one of the embodiments, VC is 0.1 to 5 wt % in the electrolyte.

In one of the embodiments, PS is 0.1 to 5 wt % or less in the electrolyte.

In one of the embodiments, PC is 0.1 to 10 wt % or less in the electrolyte.

In another aspect, the porous polymer separator has a porosity of about 30% to 90%.

DETAILED DESCRIPTION

Figure 1:
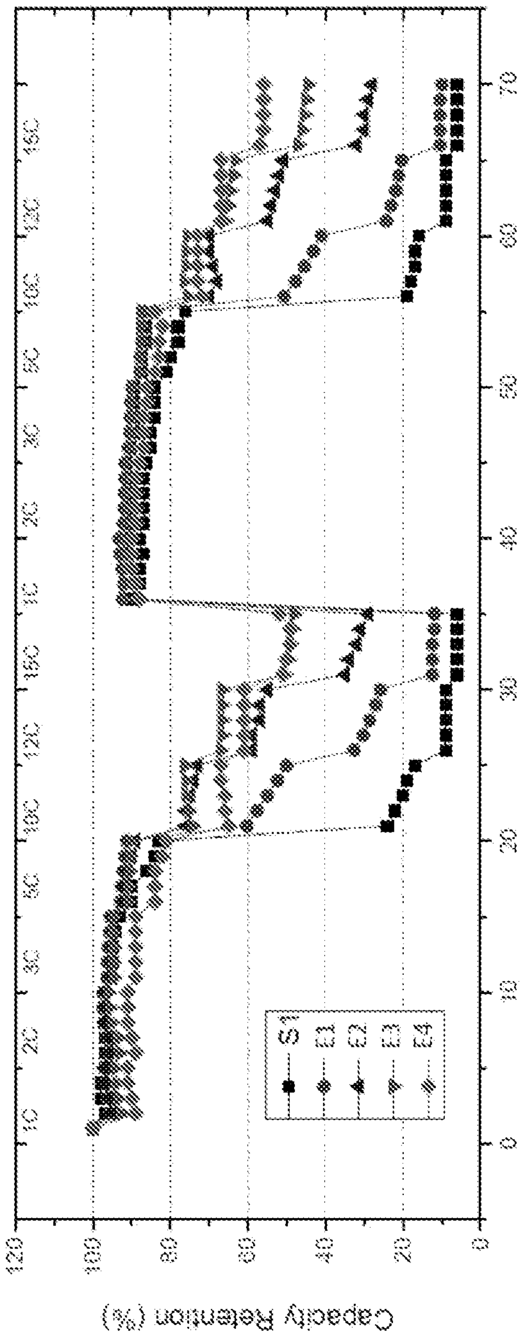
FIG. 1 illustrates rate performances of LCO/graphite batteries of Examples 1 to 4 and Comparative Example 1 at room temperature (about 25° C.)

The present invention relates to a lithium-based battery. Particularly, the lithium-based battery comprises an electrolyte including at least two lithium salts selected from lithium hexafluorophosphate, lithium bis(trifluoromethanesulfonyl) imide, lithium bis(fluorosulfonyl)imide or lithium tetrafluoroborate. Through the careful selection of lithium salts in the electrolyte, the lithium-based battery has an unexpectedly reliable rate performance while operating at a high discharge rate due to the increase in lithium ion concentration discussed above.

In one of the embodiments, the electrolyte comprises lithium hexafluorophosphate and another lithium salt selected from lithium bis(trifluoromethanesulfonyl)imide, lithium bis(fluorosulfonyl)imide or lithium tetrafluoroborate. The concentration of lithium hexafluorophosphate, in particular, may range from 0.5M to 1.5M, and the total concentration of the other lithium salt or salts may range from 0.1M to 4.5M. More particularly, the total concentration of the other lithium salt or salts is from 0.1 to 3M. Preferably, the molar ratio of lithium hexafluorophosphate to the other lithium salt ranges from 15:1 to 1:6. More preferably, the molar ratio of lithium hexafluorophosphate to the other lithium salt ranges from 2:1 to 2:3.

In one of the embodiments, the molar ratio of lithium hexafluorophosphate to lithium bis(trifluoromethanesulfonyl)imide ranges between 15:1 and 1:6. In another embodiment, the molar ratio of lithium hexafluorophosphate to lithium bis(trifluoromethanesulfonyl)imide ranges from 2:1 to 2:3. The lithium-based battery including a electrolyte in dual lithium salt system ($LiPF_6$:LiTFSI=1:1 (mole/mol)) has at least 1.5 times the capacity retention of a lithium-based battery including an electrolyte with only one lithium salt.

A further lithium salt additive, such as lithium difluoro (oxalato)borate (LiDFOB), lithium bis(oxalate) borate, lithium difluoro(bisoxalato)phosphate, or lithium difluorophosphate is also added to the electrolyte in an amount from 0.1 to 5 wt. %, including 1-4 wt. %, 2-4 wt. %, and 2-3 wt. %. Unexpectedly, this combination of lithium salts and lithium salt additives results in a substantial increase in battery performance, particularly, battery capacity retention, even at low temperatures. As will be seen in the Examples, below, batteries experience a six-fold increase in capacity retention and exhibited significant improvement in discharge rate of 10C to 15C. This increased battery performance is possible even at a relatively low total amount of lithium salts in the electrolyte and is due to the unexpected results obtained from the selected combination of salts. In particular, for maximum economic efficiency, balancing both costs and performance, the concentration may be from 1.5 to 2M.

The solvent selection also contributes to the unexpected increases in battery performance. In one aspect, the solvent may be a non-aquous solvent that includes one or more of ethylene carbonate, diethyl carbonate, ethyl methyl carbonate, dimethyl carbonate. In one embodiment, the ethylene carbonate has a volume percentage of 20% to 70% based on the volume of the solvent, diethyl carbonate has a volume percentage of 2% to 50% based on the volume of the solvent, ethyl methyl carbonate has a volume percentage of 2% to 60% based on the volume of the solvent and dimethyl carbonate has a volume percentage of 2% to 60% based on the volume of the solvent.

In addition to the lithium salt additive, the electrolyte may also include small amounts of further additives that enhance battery performance. This additive may be one or more of fluoroethylene carbonate, vinylene carbonate, 1,3-propane sultone, or propylene carbonate. These may be added in an amount from 0.1 to 5 wt % based on the electrolyte.

In one of the embodiments, the cathode is lithium cobalt oxide or lithium nickel manganese cobalt oxide.

In one of the embodiments, the anode is graphite.

In one of the embodiments, the porous polymer separator is a commercial PE separator. In particular, the porous polymer separator has a porosity of about 30% to 90%.

The lithium-based battery may be, but is not limited to, a lithium-ion battery, or an anode free lithium metal battery.

EXAMPLES

Lithium-ion batteries of Examples 1 to 4 (E1 to E4) and Comparative Example 1 (S1) were provided to undergo multiple charge-discharge cycles and the capacities thereof were recorded. The parameters of the lithium-ion batteries of Examples 1 to 4 and Comparative Example 1 were the same (listed in Table 1), except the lithium salt concentration in the electrolyte thereof listed in Table 2. The specific area capacity was 1.71 mA/cm$^2$ at 0.1C in the lithium-ion batteries of Examples 1 to 4 (E1 to E4) and Comparative Example 1 (S1).

TABLE 1

| | Component |
|---|---|
| Cathode | Lithium cobalt oxide (LCO) |
| Anode | Graphite |
| Base solvent (v/v/v) | EC/DMC/DEC = 33.3/33.3/33.3 |
| Additive (wt %) based on the amount of electrolyte | VC/FEC/LiDFOB = 0.5/0.5/0.8 |

TABLE 2

| | | E1 | E2 | E3 | E4 | S1 |
|---|---|---|---|---|---|---|
| Li salt concentration | $LiPF_6$ | 1M | 1M | 1M | 1M | 1M |
| | LiTFSI | 0.2M | 0.5M | 1M | 1.5M | — |

The discharging performances of lithium-ion batteries of Examples 1 to 4 and Comparative Example 1 at C rates from 1C to 15C was evaluated and shown in FIG. 1 (as the capacity of first cycle set to be 100%). In this test, all of the charging rates were 1C.

Since there was no addition of LiTFSI in S1, the capacity retention of S1 declined drastically from 10C to 15C. In contrast, electrolytes of E1 to E4 exhibited significant improvement in discharge rate of 10C to 15C. The results showed that electrolytes with dual lithium salts ($LiPF_6$ and LITFSI) were effective to increase capacity retention at a high discharge rate (≥10C).

Figure 2:
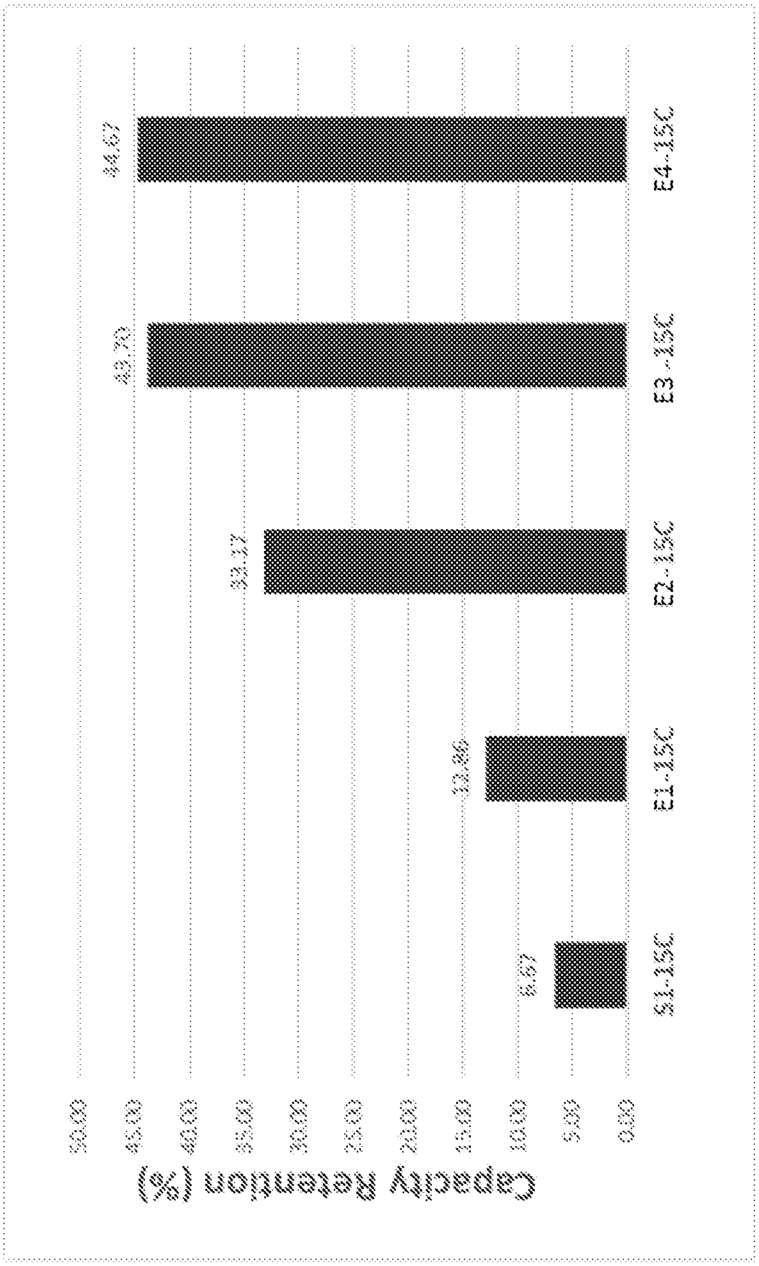
FIG. 2 illustrates capacity retention of LCO/graphite batteries of Examples 1 to 4 and Comparative Example 1 at a discharge rate of 15C while setting the capacity thereof at a charge rate of 1C as standard.

The discharge capacity retention of the first cycle via various electrolytes at 15C is presented in FIG. 2. As shown in FIG. 2, the discharge rate performance at 15C increased with the concentration of LiTFSI in the range of 0.2 M to 1.5M. The discharge capacity retention at was increased from 6.67% to 43.7% after the addition of 1M LiTFSI compared to S1. However, after LiTFSI concentration was increased to 1.5M, the capacity retention at 15C discharge was increased by less than 1%.

Figure 3:
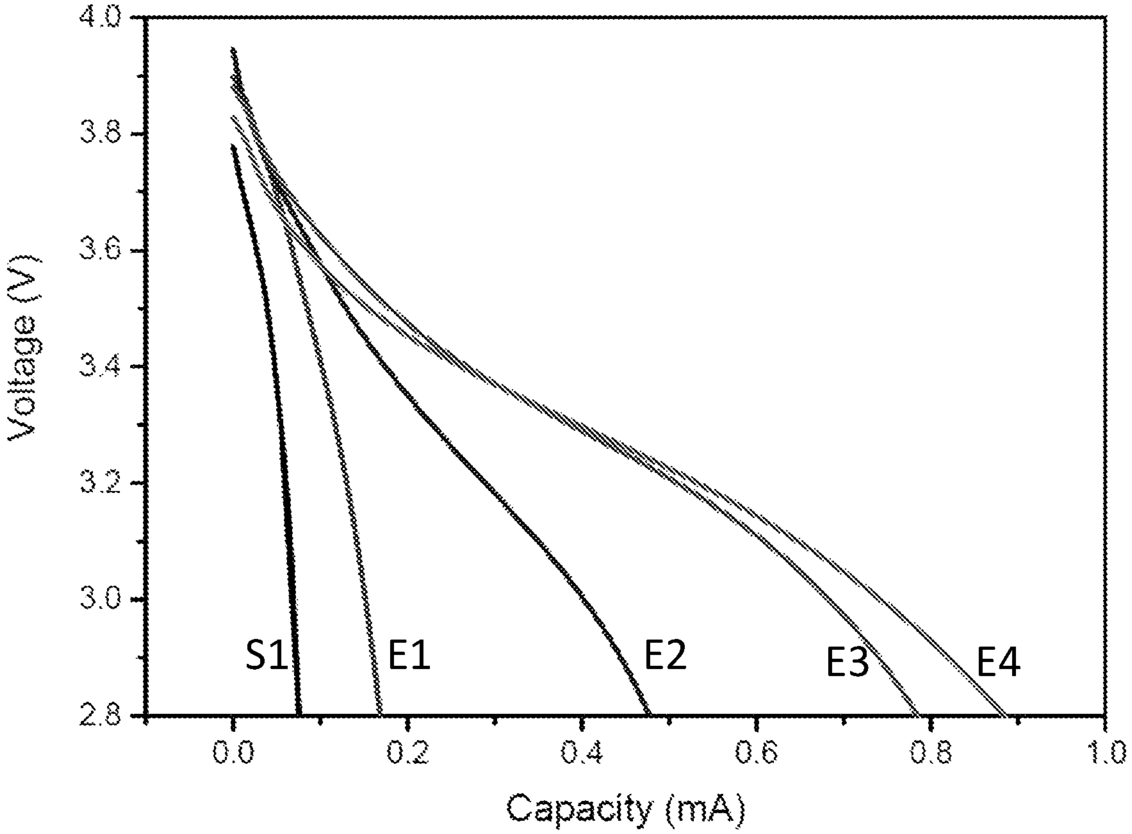
FIG. 3 illustrates discharge curves of LCO/graphite batteries of Examples 1 to 4 and Comparative Example 1 at a discharge rate of 15C.

As shown in FIG. 3, at the discharge rate of 15C, the battery voltage dropped to the cut off voltage quickly and there was not any voltage plateau observed in Comparative Example (S1). After addition of LiTFSI (corresponding to E1 to E4), the discharge capacity had significant improvement and a clear voltage plateau can be observed in E2 to E4. It is noted that the discharge capacity increased with the added concentration of LiTFSI.

Lithium-ion batteries of Example 3A (E3A) and Comparative Example 1A (S1A) were provided to undergo multiple charge-discharge cycles and the capacities thereof were recorded. The parameters of the lithium-ion batteries of Example 3A and Comparative Example 1A were the same as the lithium-ion batteries of Example 3A and Comparative Example 1A respectively, except the cathode was lithium nickel manganese cobalt (NMC) in E3A and S1A. The specific area capacity was 1.48 mA/cm$^2$@ 0.1C in the lithium-ion batteries of Example 3A and Comparative Example 1A.

Figure 4:
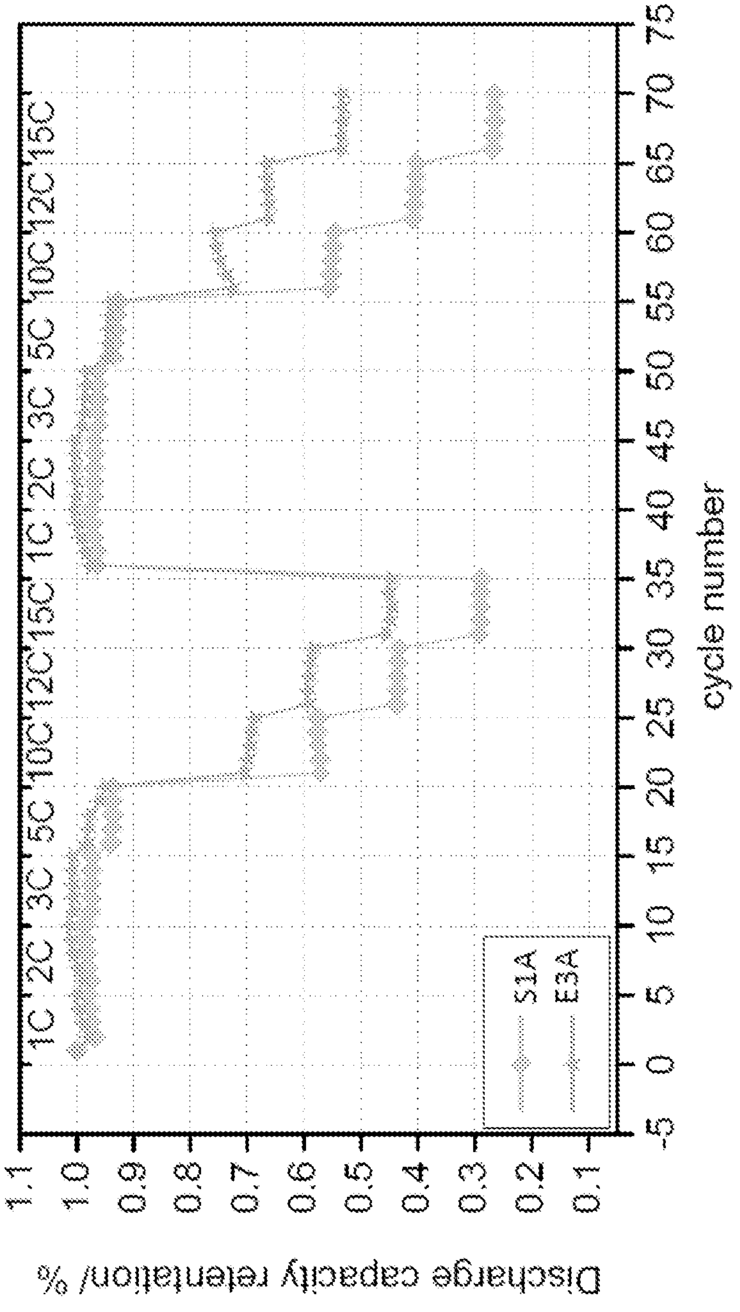
FIG. 4 illustrates rate performances of NCM/graphite batteries of Example 3A and Comparative Example 1A at room temperature (about 25° C.)

The discharging performances of lithium-ion batteries of E3A and S1A at C rates from 1C to 15C were evaluated and shown in FIG. 4. In this test, all of the charging rates were 1C.

Compared to S1A, E3A exhibited clear improvement at the discharge rate from 10C to 15C. The results also proved that electrolyte with dual lithium salts ($LiPF_6$ and LiTFSI) was effective to increase battery rate performance at high discharge rates (≥10C).

Figure 5:
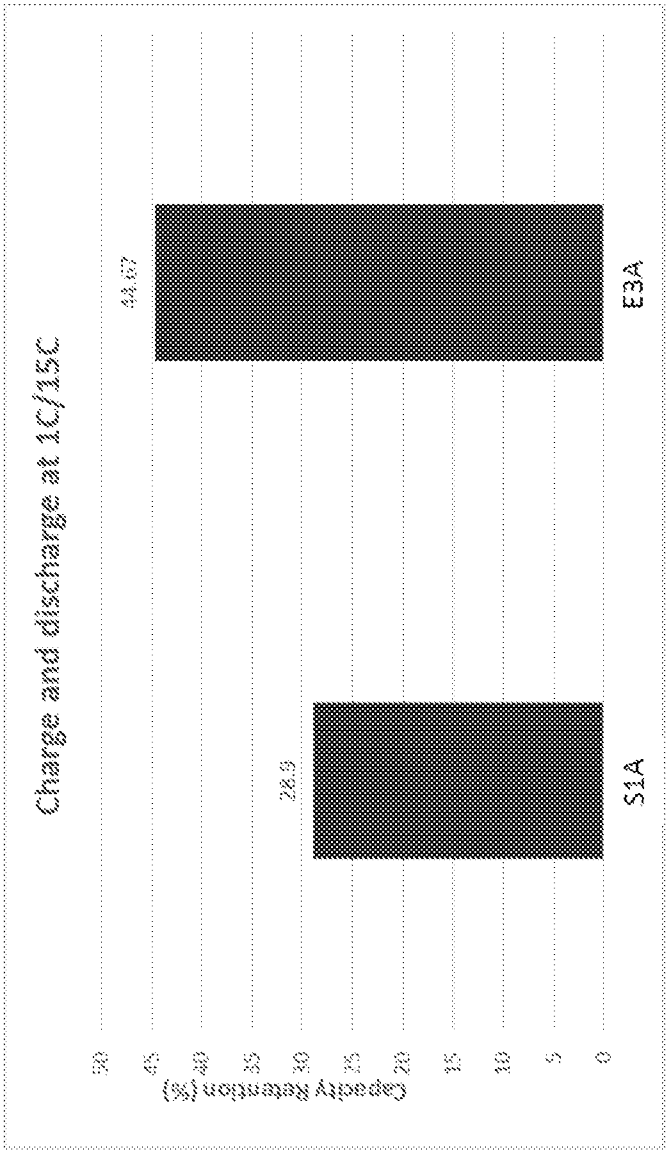
FIG. 5 illustrates capacity retention of NCM/graphite batteries of Example 3A and Comparative Example 1A at a discharge rate of 15C while setting the capacity thereof at a charge rate of 1C as standard.

The discharge capacity retention of the first cycle via various electrolytes at 15C is presented in FIG. 5. Compared with S1A, the capacity retention of lithium-ion battery E3A at discharge rate increased from 28.9% to 44.67% after the addition of 1M LiTFSI.

Figure 6:
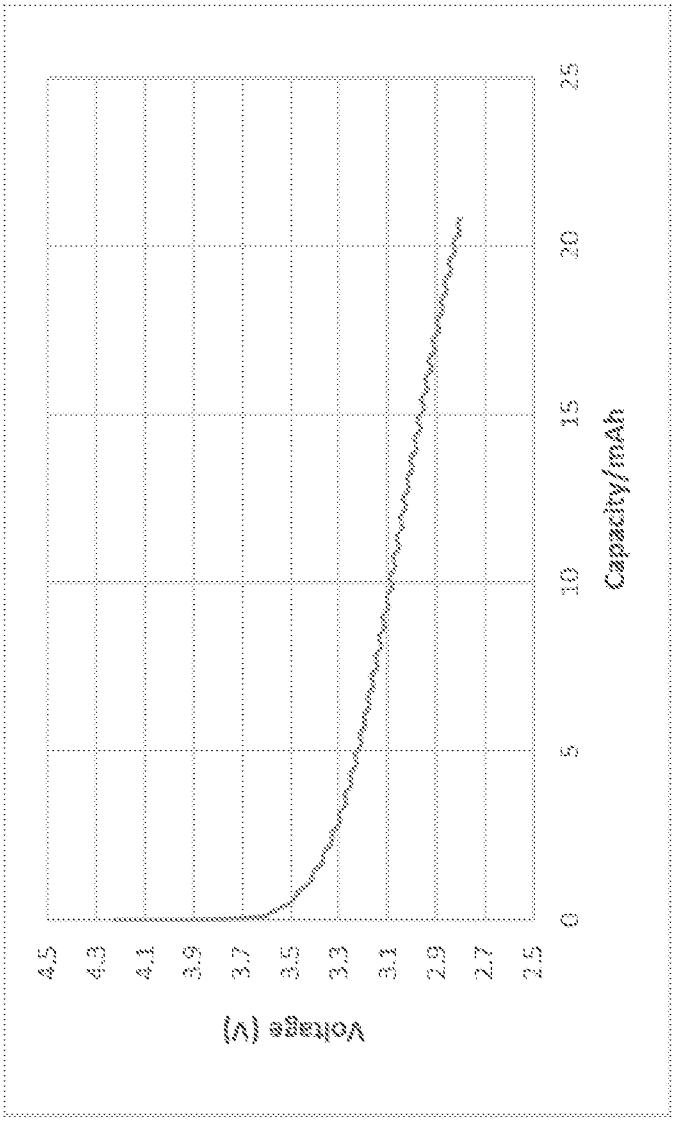
FIG. 6 illustrates a discharge rate at 1C at −20° C. of a pouch cell.

The lithium-based battery can be discharged at low temperatures, such as −20° C. Table 3 and Table 4 provide the exemplary component and concentration information. The discharging at low temperature result is shown in FIG. 6.

TABLE 3

| | Component |
|---|---|
| Cathode | Lithium cobalt oxide (LCO) |
| Anode | Graphite |
| Base solvent (v/v/v) | EC/DMC/DEC = 23.3/33.3/33.3 |
| Additive (wt %) based on the amount of electrolyte | PC = 10 |

TABLE 4

| | | F1 |
|---|---|---|
| Li salt concentration | $LiPF_6$ | 1M |
| | LiTFSI | 1M |

FIG. 6 shows a discharge at 1C at −20° C. of a pouch cell. The capacity of the pouch is 31.7 mAh at charge rate of 0.1C at room temperature. The capacity of the pouch cell at 1C at −20° C. is 20.8 mAh. The decrease of capacity at lower temperature is common because $Li^+$ ion conductivity is reduced at low temperatures. Hence, the impedance of the battery performance is stronger at lower temperature.

As used herein, terms "approximately", "basically", "substantially", and "about" are used for describing and explaining a small variation. When being used in combination with an event or circumstance, the term may refer to a case in which the event or circumstance occurs precisely, and a case in which the event or circumstance occurs approximately. As used herein with respect to a given value or range, the term "about" generally means in the range of ±10%, ±5%, ±1%, or ±0.5% of the given value or range. The range may be indicated herein as from one endpoint to another endpoint or between two endpoints. Unless otherwise specified, all the ranges disclosed in the present disclosure include endpoints. The term "substantially coplanar" may refer to two surfaces within a few micrometers (μm) positioned along the same plane, for example, within 10 μm, within 5 μm, within 1 μm, or within 0.5 μm located along the same plane. When reference is made to "substantially" the same numerical value or characteristic, the term may refer to a value within ±10%, ±5%, ±1%, or ±0.5% of the average of the values.

The invention claimed is:

1. A lithium-based battery comprising:

a cathode selected from lithium manganese oxide, lithium cobalt oxide, lithium nickel manganese cobalt oxide, lithium iron phosphate or combinations thereof;

an electrolyte including a lithium hexafluorophosphate first salt and at least one second lithium salt selected from lithium bis(trifluoromethanesulfonyl)imide, lithium bis(fluorosulfonyl)imide or lithium tetrafluoroborate;

wherein the molar ratio of lithium hexafluorophosphate to the at least one second lithium salt ranges from 1:1 to 2:3 and a concentration in the electrolyte of the first salt and the at least one second salt is from approximately 1.5M to approximately 5M;

wherein the electrolyte further comprises a lithium salt additive in an amount from 0.1% to 5% of a total weight of the electrolyte;

an anode selected from silicon, silicon oxide, carbon nanotubes, lithium metal, graphene, graphite or combinations thereof; and a porous polymer separator, wherein the lithium-based battery maintains a stable voltage plateau at a discharge rate of 10C or more.

2. The lithium-based battery of claim 1, wherein the electrolyte has a lithium hexafluorophosphate concentration of 0.5M to 1.5M.

3. The lithium-based battery of claim 2, wherein the electrolyte has a bis(trifluoromethanesulfonyl)imide concentration and/or lithium lithium bis(fluorosulfonyl)imide concentration and/or lithium tetrafluoroborate concentration of 0.1M to 3.0M.

4. The lithium-based battery of claim 1, wherein the lithium salt additive is lithium difluoro(oxalato)borate lithium bis(oxalate)borate, lithium difluoro(bisoxalato) phosphate, or lithium difluorophosphate.

5. The lithium-based battery of claim 1, wherein the electrolyte further comprises a solvent selected from ethylene carbonate, diethyl carbonate, ethyl methyl carbonate, dimethyl carbonate or combinations thereof.

6. The lithium-based battery of claim 5, wherein ethylene carbonate has a volume percentage of 20% to 70% based on the volume of the solvent.

7. The lithium-based battery of claim 5, wherein diethyl carbonate has a volume percentage of 2% to 50% based on the volume of the solvent.

8. The lithium-based battery of claim 5, wherein ethyl methyl carbonate has a volume percentage of 2% to 60% based on the volume of the solvent.

9. The lithium-based battery of claim 5, wherein dimethyl carbonate has a volume percentage of 2% to 60% based on the volume of the solvent.

10. The lithium-based battery of claim 1, wherein the electrolyte further comprises an additive selected from fluoroethylene carbonate, vinylene carbonate, 1,3-propane sultone, propylene carbonate, or combinations thereof.

11. The lithium-based battery of claim 10, wherein the additive is fluoroethylene carbonate in an amount of 0.1 to 5 wt % based on the electrolyte.

12. The lithium-based battery of claim 10, wherein the additive is vinylene carbonate in an amount of 0.1 to 5 wt % based on the electrolyte.

13. The lithium-based battery of claim 10, wherein the additive is 1,3-propane sultone in an amount of 0.1 to 5 wt % based on the electrolyte.

14. The lithium-based battery of claim 10, wherein the additive is propylene carbonate in an amount of 0.1 to 10 wt % or less based on the electrolyte.

15. The lithium-based battery of claim 1, wherein the porous polymer separator has a porosity of about 30% to 90%.

* * * * *